United States Patent [19]

Barker et al.

[11] 4,257,166
[45] Mar. 24, 1981

[54] ADJUSTABLE DRILL TEMPLATE

[76] Inventors: Gary L. Barker; Becky S. Barker, both of Rte. 5, Box 476, Claremore, Okla. 74017

[21] Appl. No.: 71,401

[22] Filed: Aug. 30, 1979

[51] Int. Cl.³ .............................................. B23B 49/02
[52] U.S. Cl. ..................................... 33/185 R; 33/189; 408/115 B; 408/241 B
[58] Field of Search ............... 33/174 G, 185 R, 189, 33/197, DIG. 10; 408/72 B, 115 R, 115 B, 241 B

[56] References Cited

U.S. PATENT DOCUMENTS

| D. 230,628 | 3/1974 | Sunley | 33/197 |
|---|---|---|---|
| 2,211,634 | 8/1940 | Baker | 408/115 |
| 2,647,325 | 8/1953 | Little | 33/197 |
| 2,917,331 | 12/1959 | Baer et al. | 408/72 B |
| 2,949,798 | 8/1960 | Berta, Jr. | 33/174 G |
| 3,082,651 | 3/1963 | Patrick, Jr. | 33/189 |
| 3,381,387 | 5/1968 | Landrum, Jr. | 33/189 |
| 3,583,823 | 6/1971 | Eaton et al. | 408/115 |
| 4,054,396 | 10/1977 | Cassidy | 33/189 |
| 4,176,989 | 12/1979 | Wolff | 408/115 R |

FOREIGN PATENT DOCUMENTS 217755 6/1924 United Kingdom ................ 408/115

Primary Examiner—Richard R. Stearns
Attorney, Agent, or Firm—James H. Chafin

[57] ABSTRACT

An adjustable template for locating drill hole positions primarily for cabinet doors and drawers. The template consists of a flat rectangular plate having spaced drill guide holes therethrough. The position of the plate with respect to the item to be drilled is established by way of a first elongated rod extending outwardly from one edge of the plate and a pair of spaced parallel rods extending outwardly from an adjacent edge of the plate, each rod having an adjustable edge guide movably mounted thereon.

9 Claims, 6 Drawing Figures

U.S. Patent  Mar. 24, 1981  4,257,166
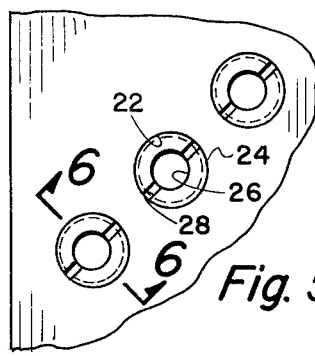
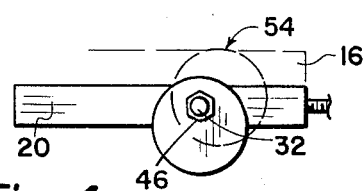
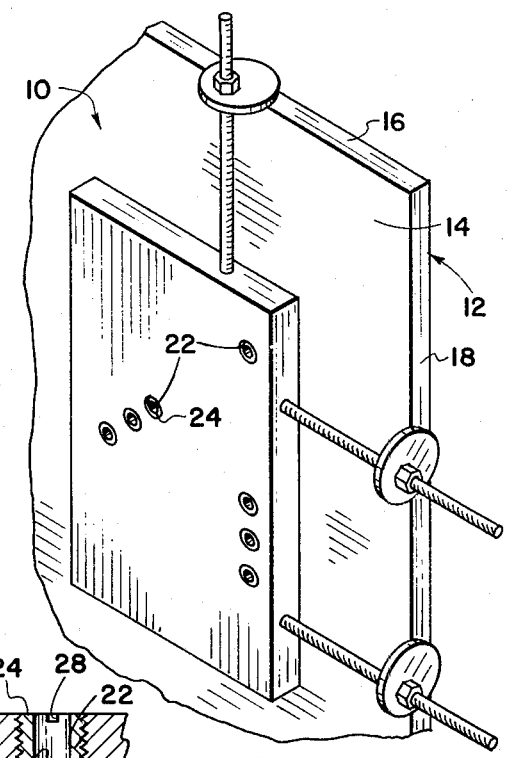
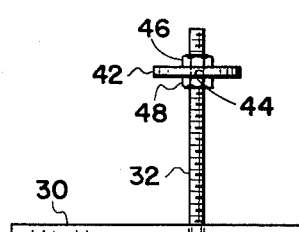
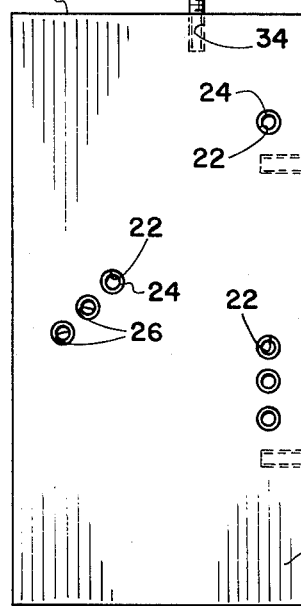
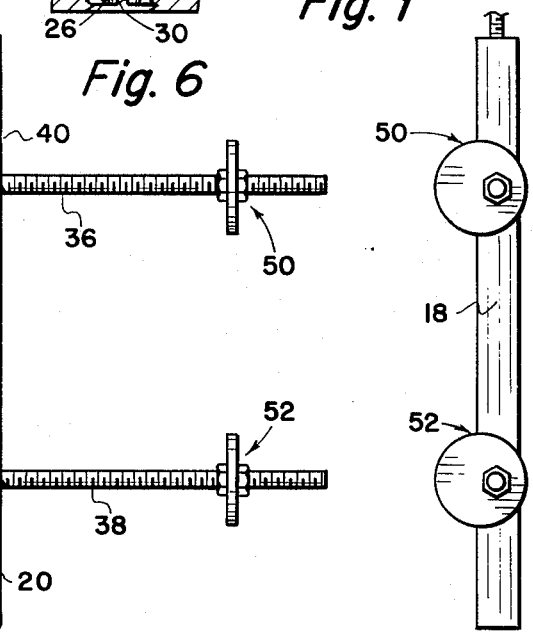

ADJUSTABLE DRILL TEMPLATE

BACKGROUND OF THE INVENTION

I. Field of the Invention

The present invention relates to a drill template and more particularly, but not by way of limitation, to an adjustable drill template for locating drill hole positions on cabinet doors and drawers.

II. Background of the Invention

Cabinet makers usually construct a cabinet assembly where it is desirable to locate the handles or "pulls", all in the same position with respect to the edge of the door or drawer or in a mirror image of that position when a door opens in an opposite direction.

To measure and mark the positions for the cabinet pulls for each of the doors and drawers is a very time-consuming operation and often results in mistakes which if not caught, cause damaged or wasted materials. This is even more often true when the cabinet maker is a non-professional working in his own workshop.

Often cabinet makers will devise a template for each specific job by attaching two or three boards together at mutually right angles to form L-shaped cross-sections, then drilling template holes through the boards in order to speed up their work.

This has many obvious disadvantages, one being that the template will usually not work for the drill holes that have to form a mirror image and secondly, as the template is used, the template holes will become damaged and often will result in the holes being either misplaced or not perpendicular to the item being drilled.

Attempts have been made in the past to provide templates of this nature which utilize edge engagement flanges such as is taught in the patent to Little, U.S. Pat. No. 2,647,325 issued in 1953 and the patent to Berta, Jr., U.S. Pat. No. 2,949,798 issued in 1960. Further, the utilization of the elongated rod member to locate a template with respect to the edges of a piece of material is taught in the patent to Cassidy, U.S. Pat. No. 4,054,396 issued in 1977.

SUMMARY OF THE INVENTION

The present invention provides an adjustable drill hole template which is particularly designed and constructed to provide the cabinet maker or the home shopsmith with the ability to quickly and accurately locate and drill holes for receiving cabinet pulls therein, all in one operation.

The device primarily comprises a flat plate member which serves as the drill template and which is provided with a plurality of spaced holes which can be prepositioned to correspond with standard spacing of readily available off-the-shelf cabinet pulls.

The template may be provided with a plurality of vertically oriented template hole patterns or set at an angle such as 45° which is common in some cabinet construction. Each drill hole is of the same size and is provided with internal threading therethrough for receiving as cylindrical threaded insert therein. The insert then is provided with a longitudinal bore therethrough for receiving a drill bit. The insert is made of a hardened material to withstand wear after repeated use with a drill bit. The outside of the diameter, naturally, is of a standard size commensurate with the threaded hole through the template plate while the drill bit hole extending longitudinally therethrough may be of different sizes to receive different sized drill bits. The insert further can include a slot for receiving a screwdriver or other wrenching tool therein so that the insert may be installed in the template holes so that the outer ends will be flush or inside the template thereby allowing the template to be turned over and used on either side in order to provide a mirror image of the hole positions for different cabinet doors.

The plate is normally rectangular in shape and has extending outwardly from one edge thereof an elongated threaded rod such as all-thread rod. On an adjacent edge of the template plate are a pair of spaced, parallel elongated all-thread rods similar to or identical with the first-mentioned rod.

Movably mounted on each of the elongated threaded rods, is a disc member, the plane of which is perpendicular to the rod on which it is mounted and which serves as an edge guide to contact the edge of the cabinet door or drawer being drilled. Each edge guide disc is infinitely adjustable along the rod by means of a pair of threaded nuts located on each side of the disc thereby providing extremely accurate location of the edge guide with respect to the template. The accuracy and ease of adjustment naturally depends on the pitch of the threads.

Further these edge guide disc members are eccentrically mounted on the elongated rods so that the surface area of contact with the edge of the material being drilled may be maximized while being able to avoid interference with cabinet frames and other obstacles.

DESCRIPTION OF THE DRAWINGS

Other and further advantageous features of the present invention will hereinafter more fully appear in connection with a detailed description of the drawings in which:

FIG. 1 is a perspective view of a drill template embodying the present invention.

FIG. 2 is a front elevational view of the template of FIG. 1.

FIG. 3 is a side elevational view of the template of FIG. 1.

FIG. 4 is a top plan view of the template of FIG. 1.

FIG. 5 is a detail of typical drill holes provided in the template of FIG. 1.

FIG. 6 is a sectional view of a template drill hole and drill insert taken along the broken lines 6—6 of FIG. 5.

DESCRIPTION OF THE PREFERRED EMBODIMENT

Referring to the drawings in detail, reference character 10 generally indicates an adjustable template for locating drill holes on cabinet doors and the like, a typical cabinet door edge being represented in FIG. 1 by reference character 12. The typical cabinet door 12 will have an outer face or surface 14, a top edge 16 and an outer edge 18 perpendicular to the edge 16.

The adjustable template 10 generally comprises a flat, rectangular plate member 20 having a plurality of threaded holes 22 arranged on the surface thereof in pre-determined patterns to fit standard off-the-shelf cabinet pull stud patterns. A plurality of cylindrical threaded inserts 24 are provided and which may be threadably inserted into the holes 22. The thread will be of a class 1 fit to resist unwanted rotation when used in conjunction with a drill bit.

Each insert 24 is provided with a central longitudinal bore 26 therethrough, the bores 26 being of different diameters corresponding with the standard drill bit sizes. The inserts may also be provided, at each end thereof, with screwdriver-type slot recesses 28 and 30 or other suitable wrenching elements in order to rotatably thread the inserts 24 into the holes 22. The inserts 24 are made of a hardened material such as steel or brass in order to reduce wear and damage caused by the drill bit being inserted and operated within the bores 26.

A first edge 30 of the plate member 20 is provided with an elongated all-thread rod member 32 extending outwardly therefrom and at right angles to said edge 30. The rod 32 may be made as an integral part of the plate member 20 or may be installed therein by the use of a threaded bore 34.

A pair of similar elongated all-thread rods 36 and 38 are secured into an adjacent edge 40 of the plate member 20 in a similar manner. The rods 36 and 38 are perpendicular to the edge 40 and will therefore be at a right angle to the rod 32.

The rod 32 is provided with a circular disc member 42 having an off-center bore 44 for slidably receiving the rod 32 therethrough such that the disc member 42 lies in a plane perpendicular to the rod 32. The disc 42 may be positioned at any place along the rod 32 and locked into position by a pair of oppositely disposed nut members 46 and 48. The disc member 42 and the oppositely disposed nut members 46 and 48 form an edge guide assembly. Similar edge guide assemblies 50 and 52 are provided for the other two rods 36 and 38.

In use, the first step would be to select the desired hole pattern and drill size corresponding with the cabinet pulls that are to be used. Insert members 24 with the proper size bore 26 are then installed into the selected threaded holes 22 of the plate 20. It is noted that the inserts 24 have a length near the same size of the thickness of the plate 20 but no longer than the thickness of the plate 20. This permits the insert to be fully installed within the bores 22 so that either surface of the plate 20 may be used without interference with the inserts.

The nut members 48 and 46 may then be adjusted to allow each disc member 42 of each of the edge guide assemblies to be positioned at the proper distance from the edges 30 and 40 of the plate member 20.

On a typical cabinet door or drawer plate as shown in FIG. 1 by reference character 12, the edge guides 50 and 52 will be located the same distance from the edge 40 of the plate member 20. The nut members 46 and 48 may then be rotated into position on either side of the disc member 42, but before being tightened, in order to lock the disc member, the disc member may be rotated so that one edge thereof is flush with the inside edge of the door or drawer to be drilled as shown in FIG. 4 at reference character 54. This will allow the disc member to have maximum contact with the edge 16 of the door 12 while not interfering with the door frame or other obstacles therearound. Stated another way, the drilling of the holes may be made with the door opened or closed since the edge guide members will not interfere with the surrounding frame.

When the template is placed into position as shown in FIG. 1, a drill may be used to drill through the template bores 26 and through the corresponding door member 12. When it is desired to drill a door which opens in the opposite direction, in order to provide a mirror image hole pattern, the device is turned around so that the opposite face of the plate member 20 contacts the door to be drilled.

From the foregoing, it is apparent that the present invention teaches an adjustable drill template which provides a great amount of accuracy and repeatability of a desired hole pattern while being simple and efficient in operation.

Whereas, the present invention has been described in particular relation to the drawings attached hereto, other and further modifications apart from those shown or suggested herein may be made within the spirit and scope of the invention.

For instance, where the rod members 32, 36 and 38 are too short for a particular operation, the all-thread rods may simply be removed and replaced with longer rods, still utilizing the same edge guide assemblies as shown.

What is claimed is:
1. An adjustable template for locating drill holes on cabinet doors and drawers comprising:
   (a) a plate member having a plurality of guide bores therethrough and first and second outside edges which are mutually perpendicular;
   (b) an elongated threaded rod secured to and extending outwardly from the first edge of the plate member at a right angle thereto;
   (c) a pair of spaced parallel elongated rods secured to and extending outwardly from the second edge of the plate member at a right angle thereto; and
   (d) edge guide means adjustably secured to each elongated rod, said edge guide means being lockable in a desired position along said rods for contacting the edges of the cabinet doors and drawers.

2. An adjustable template as set forth in claim 1 wherein the plate member is rectangular.

3. An adjustable template as set forth in claim 1 wherein the guide bores comprise a plurality of aligned spaced bores, the spacing and alignment being commensurate with standard cabinet door and drawer pull patterns.

4. An adjustable template as set forth in claim 1 wherein the guide bores comprise cylindrical bores of equal size through the plate member and a plurality of cylindrical inserts having outer diameter compatible with the size of the bores and having longitudinal center holes of different sizes corresponding to standard drill bit sizes.

5. An adjustable template as set forth in claim 4 wherein the cylindrical bores are threaded and the outer lateral surfaces of the cylindrical inserts are provided with compatible threads having a tight fit.

6. An adjustable template as set forth in claim 5 wherein at least one outer end of each insert is provided with recess means for receiving a wrenching element for effecting rotation thereof within the bores.

7. An adjustable template as set forth in claim 4 wherein the cylindrical inserts are shorter than the cylindrical bores.

8. An adjustable template as set forth in claim 1 wherein the edge guide means comprises a disc member having a bore therethrough for receiving the elongated rods slidably therethrough and wherein said elongated rods are threaded and including threaded back-up nuts on either side thereof to position the disc along the rod.

9. An adjustable template as set forth in claim 8 wherein the bore through the disc member is off center whereby said disc member may be eccentrically pivoted on the rod.

* * * * *